US012705165B1

(12) United States Patent
Kulikov et al.

(10) Patent No.: US 12,705,165 B1
(45) Date of Patent: Aug. 11, 2026

(54) UNIFIED UI COMPONENTS TESTING APPROACH IN A CLOUD PLATFORM VIA FAÇADE PATTERN SYSTEM AND METHOD

(71) Applicant: CloudBlue LLC, Irvine, CA (US)

(72) Inventors: Viktor Kulikov, Sofia (BG); Artem Ilin, Sofia (BG); Dmitry Nozdrin, Sofia (BG)

(73) Assignee: CloudBlue LLC, Irvine, CA (US)

( * ) Notice: Subject to any disclaimer, the term of this patent is extended or adjusted under 35 U.S.C. 154(b) by 0 days.

(21) Appl. No.: 19/067,359

(22) Filed: Feb. 28, 2025

(51) Int. Cl.
*G06F 11/3668* (2025.01)
*G06F 9/451* (2018.01)

(52) U.S. Cl.
CPC .......... *G06F 11/3688* (2013.01); *G06F 9/451* (2018.02); *G06F 11/3684* (2013.01)

(58) Field of Classification Search
CPC ... G06F 11/3688; G06F 9/451; G06F 11/3684
See application file for complete search history.

(56) References Cited

U.S. PATENT DOCUMENTS

2017/0192882 A1* 7/2017 Bhagavathiammal .......................... G06F 11/3684
2020/0356466 A1* 11/2020 Thangam ................ G06F 40/12
2025/0148197 A1* 5/2025 Weedon ................ G06F 40/174
2025/0335338 A1* 10/2025 Goel ...................... G06F 11/32

OTHER PUBLICATIONS

Eli Bendersky, Python unit testing: parametrized test cases, Aug. 2, 2011, https://eli.thegreenplace.net/2011/08/02/python-unit-testing-parametrized-test-cases (Year: 2011).*
Steffen Lorenz, DDT with Python Selenium, Sep. 9, 2015, https://softwaretester.info/ddt-with-python-selenium/ (Year: 2015).*

* cited by examiner

*Primary Examiner* — Bryce P Bonzo
*Assistant Examiner* — Xinyuan Yu
(74) *Attorney, Agent, or Firm* — Ice Miller LLP

(57) ABSTRACT

Systems and methods are provided for centralized and hierarchical testing of user interface (UI) components are disclosed. The system includes a base test class configured to dynamically manage and execute test cases by initializing with a selector to identify target components in a Document Object Model (DOM). Test cases are registered using an addCase method, which aggregates test cases at a topmost parent instance for centralized storage. A wrapper is created for the target component, enabling dynamic test execution and validation using a reusable facade library. The system enables test isolation by destroying the wrapper after execution. Component-specific subclasses extend the base test class to validate UI component parameters, including visibility, events, column data, and pagination. Methods and instructions stored on a non-transitory computer-readable medium enable dynamic instantiation, test propagation, and execution, ensuring scalable and reusable testing workflows.

20 Claims, 7 Drawing Sheets

UNIFIED UI COMPONENTS TESTING APPROACH IN A CLOUD PLATFORM VIA FAÇADE PATTERN SYSTEM AND METHOD

BACKGROUND

In software development, testing is a critical process for ensuring code correctness, stability, and reliability. As applications increase in complexity, particularly those involving user interface (UI) components, the need for comprehensive test coverage becomes more pronounced. Testing frameworks such as Jest, combined with utility libraries like Vue Test Utils, have become widely adopted for performing unit tests and integration tests in modern frontend development. These frameworks enable developers to validate component behavior, detect regressions, and ensure the integrity of application logic. However, as applications scale, testing frameworks alone do not fully address the challenges associated with managing a growing volume of test cases or maintaining consistency across projects.

Traditionally, developers write individual test cases for each UI component, often creating highly specific and repetitive test logic. While this approach is sufficient for smaller projects, it becomes unsustainable as applications expand and teams grow. Redundant test code increases maintenance burdens, consumes unnecessary development resources, and introduces potential errors when updates are required. For instance, if a shared dependency, such as a class name or method signature, changes, the corresponding test logic must be updated manually across all dependent test cases. This manual effort is time-consuming and error-prone, particularly when tests are dispersed across multiple components or projects.

Developers encounter challenges when applications rely on UI toolkits or libraries that provide reusable components. For example, developers produce applications using a custom UI framework, such as UX1, which creates a facade over base UI components. These frameworks encapsulate common UI functionality, enabling developers to reuse standardized components across projects. While this approach improves UI development efficiency, it introduces additional challenges in test development. UI components within these toolkits often share similar behaviors and architectures, but the parameters, environments, and specific use cases vary between projects. Consequently, developers frequently recreate near-identical test cases for similar components, leading to redundant and fragmented test logic. If a change occurs in the underlying toolkit, all dependent tests require updates, further increasing maintenance overhead.

Existing redundancy tests may use utility functions, test libraries, and abstraction layers. For example, utility functions may encapsulate common test logic, such as verifying component visibility or triggering events. While utility functions reduce code duplication to some extent, they do not provide a structured or scalable solution for organizing test cases. Additionally, previous abstraction techniques have often introduced excessive memory consumption or performance bottlenecks, particularly when dealing with complex test suites. In some cases, these methods have inadvertently increased the number of test cases required, further complicating test management.

BRIEF SUMMARY OF THE INVENTION

Embodiments described herein provide a more efficient, scalable, and structured approach to UI testing by leveraging a facade-based architecture. In some embodiments, the approach addresses challenges such as redundant test logic, fragmented test maintenance, and the manual effort required for updating tests across multiple projects. The embodiments enable dynamic test case management, modular test execution, and simplified maintenance by organizing testing logic into a hierarchical structure with reusable base classes and component-specific subclasses.

For example, the present invention introduces a BaseTest class that serves as the root for all test definitions and provides core functionality, including methods for aggregating, storing, and executing test cases. Subclasses inherited from the BaseTest class act as facades for specific components, such as buttons or tables, encapsulating common testing logic while supporting customization for component-specific behaviors. By centralizing reusable functionality within these facade classes, developers eliminate the need to recreate test logic for similar components. A single update to the underlying framework or toolkit can propagate to all dependent tests without manual intervention. Additionally, the system supports dynamic test case registration through methods such as addCase( ) and enables efficient execution by aggregating tests into a centralized pool.

Embodiments further enhance scalability and modularity by structuring test logic into layers, where base classes provide shared functionality, and subclasses extend this functionality for specific use cases. This hierarchical organization improves code readability by abstracting implementation details within facade classes, enabling developers to focus solely on test scenarios. The system also enables test isolation by destroying wrappers after execution, preventing unintended side effects and improving test consistency across projects. Centralized test storage and automated execution workflows further allow integration into both frontend and backend testing processes.

The embodiments described herein improve developer productivity by reducing test code duplication, minimizing maintenance overhead, and enabling dynamic test execution. Experiments have demonstrated significant improvements, including reduced development timelines, enhanced test coverage, and easier scalability. The system further facilitates collaboration between development and quality assurance teams by standardizing the testing framework, resulting in higher-quality software delivery. By addressing the limitations of prior approaches, the present invention introduces a robust, reusable, and scalable solution that streamlines test development for modern software applications.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes initialize a base test class with a selector for identifying a target component in a document object model (dom). The base test class also includes register a test case dynamically using an addcase method, the test case may include a test function and an optional search condition; aggregate the registered test case to a topmost parent instance of the base test class; execute the test case by creating a wrapper for the target component; perform test logic on the wrapper using the registered test function; and destroy the wrapper to ensure test isolation, where the base test class is further configured to propagate the test cases to a topmost parent instance for centralized execution. Other embodiments of this aspect include corresponding computer systems, apparatus, and computer programs recorded on one or more computer storage devices, each configured to perform the actions of the methods.

Implementations may include one or more of the following features. The system where the base test class further may include an addcase method, the addcase method configured to register a test case with a test name, a test function, and an optional search condition. The system may include a wrapper interface coupled to the base test class, the wrapper interface configured to dynamically instantiate test components and interact with the dom through a findcustom method. The system may include a facade library configured to store reusable facade classes, the reusable facade classes wrapping core test logic into reusable functions for testing specific UI components. The base test class includes an execution method that enables test isolation by destroying the wrapper after test execution. The component-specific subclass is configured to implement testing logic for a specific UI component. The component-specific subclass is configured to validate parameters of a UI component, including at least one of visibility, event interactions, column data, row states, or pagination functionality. Implementations of the described techniques may include hardware, a method or process, or computer software on a computer-accessible medium.

One general aspect includes a computer-implemented method for centralized and hierarchical testing of user interface (UI) components. The computer-implemented method also includes initializing a base test class with a selector for identifying a target component in a document object model (dom); registering a test case dynamically using an addcase method, the test case may include a test function and an optional search condition; aggregating the registered test case to a topmost parent instance of the base test class; executing the test case by creating a wrapper for the target component; performing test logic on the wrapper using the registered test function; and destroying the wrapper to ensure test isolation. Other embodiments of this aspect include corresponding computer systems, apparatus, and computer programs recorded on one or more computer storage devices, each configured to perform the actions of the methods.

Implementations may include one or more of the following features. The method may include propagating registered test cases through a savetest method that centralizes test storage at the topmost parent instance. The method may include dynamically locating and wrapping a specific test component using a findcustom method integrated with a wrapper interface. The method may include executing multiple test cases sequentially by iterating through a centralized test pool stored in the base test class. The subclass implements methods for validating component-specific behavior. The component-specific test subclass is configured to perform at least one of: checking component visibility, triggering events, validating column or row data, or verifying pagination states. The method may include dynamically generating a wrapper using a selector and executing test functions through the wrapper integrated with a testing framework. The method may include centralizing reusable test logic into a facade library, the facade library configured to wrap testing operations into reusable methods. Implementations of the described techniques may include hardware, a method or process, or computer software on a computer-accessible medium.

One general aspect includes a non-transitory tangible computer-readable device having instructions stored thereon that. The non-transitory tangible computer-readable device also includes initializing a base test class with a selector for identifying a target component in a document object model (dom); dynamically registering a test case using an addcase method, the test case may include a test name, a test function, and an optional search condition; aggregating registered test cases to a centralized test pool at a topmost parent instance of the base test class; executing the registered test cases by creating a wrapper for the target component using the selector; performing a test function dynamically on the wrapper; and destroying the wrapper upon completion to maintain test isolation. Other embodiments of this aspect include corresponding computer systems, apparatus, and computer programs recorded on one or more computer storage devices, each configured to perform the actions of the methods.

Implementations may include one or more of the following features. The non-transitory computer-readable device where the instructions further cause the computing device to dynamically locate and instantiate a specific test component using a findcustom method integrated with a wrapper interface. The instructions further cause the computing device to execute test cases sequentially by iterating through the aggregated test pool stored in the base test class. The instructions further cause the computing device to implement a component-specific test subclass inherited from the base test class, the subclass configured to validate component-specific parameters including visibility, event triggers, or table row states. The instructions further cause the computing device to propagate registered test cases to the topmost parent instance using a savetest method for centralized execution. Implementations of the described techniques may include hardware, a method or process, or computer software on a computer-accessible medium.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
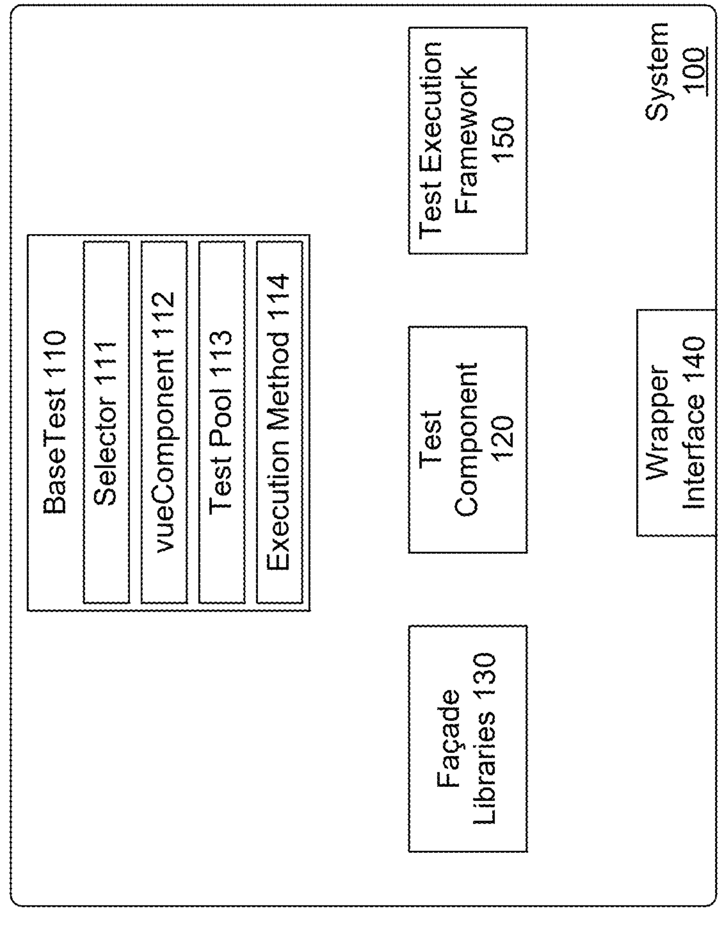
FIG. 1 is an illustration of a system for standardized and scalable testing of UI components, according to some embodiments.

FIG. 1 illustrates system 100 for standardized and scalable testing of UI components using facade-based architecture. System 100 is configured to provide a central framework for managing and executing reusable test cases for frontend and backend components. System 100 can include BaseTest 110, TestComponent 120, Facade Libraries 130, Wrapper Interface 140, and Test Execution Framework 150.

BaseTest 110 serves as a parent test class providing core testing logic and API [0026] functionality to subclasses. BaseTest 110 is configured to aggregate, organize, and execute test cases dynamically. BaseTest 110 can include parameters such as selector 111 for identifying components in the DOM and vueComponent 112 for creating test wrappers. BaseTest 110 maintains a test pool 113 for centralized storage of test cases and includes an execution method 114 for triggering test runs.

TestComponent 120 is a subclass inherited from BaseTest 110 that provides specific testing functionality for individual UI components. TestComponent 120 defines component-specific methods for testing parameters such as visibility, column verification, and row interactions. For example, TestComponent 120 can include logic for testing components like UX1Table or ExpandCard.

Facade Libraries 130 are centralized repositories of facade classes that abstract testing complexity and provide reusable testing logic. Facade Libraries 130 are configured to wrap core test methods into reusable functions, thereby hiding implementation details. Façades reduce the number of code instances needed for repetitive tests while improving test scalability and readability.

Wrapper Interface 140 provides a standardized interface for interacting with components. Wrapper Interface 140 is configured to add a findCustom( ) method to identify custom test components and wrap them into a standardized format for testing. Wrapper Interface 140 can integrate with frameworks such as Jest and Vue Test Utils.

Test Execution Framework 150 coordinates the execution of test cases by managing the lifecycle of wrappers and test components. Test Execution Framework 150 dynamically aggregates test scenarios, enables test isolation, and triggers test runs through the run( ) method. Test Execution Framework 150 also handles wrapper creation, test validation, and cleanup to prevent side effects between tests.

System 100 operates by using facade-based architecture to standardize testing across projects. The BaseTest 110 and TestComponent 120 classes ensure modularity and scalability, enabling developers to create custom facades for specific testing needs. Wrapper Interface 140 can integrate with existing test libraries. Facade Libraries 130 centralize reusable testing logic, reducing code duplication and enhancing test maintainability. Test Execution Framework 150 enables dynamic execution and aggregation of test cases, simplifying the testing process overall.

System 100 addresses inefficiencies in traditional testing approaches, such as duplicate test code, excessive memory usage, and time-consuming maintenance. By introducing centralized storage, reusable facades, and a streamlined execution process, system 100 improves test coverage, readability, and performance while minimizing developer overhead.

Figure 2:
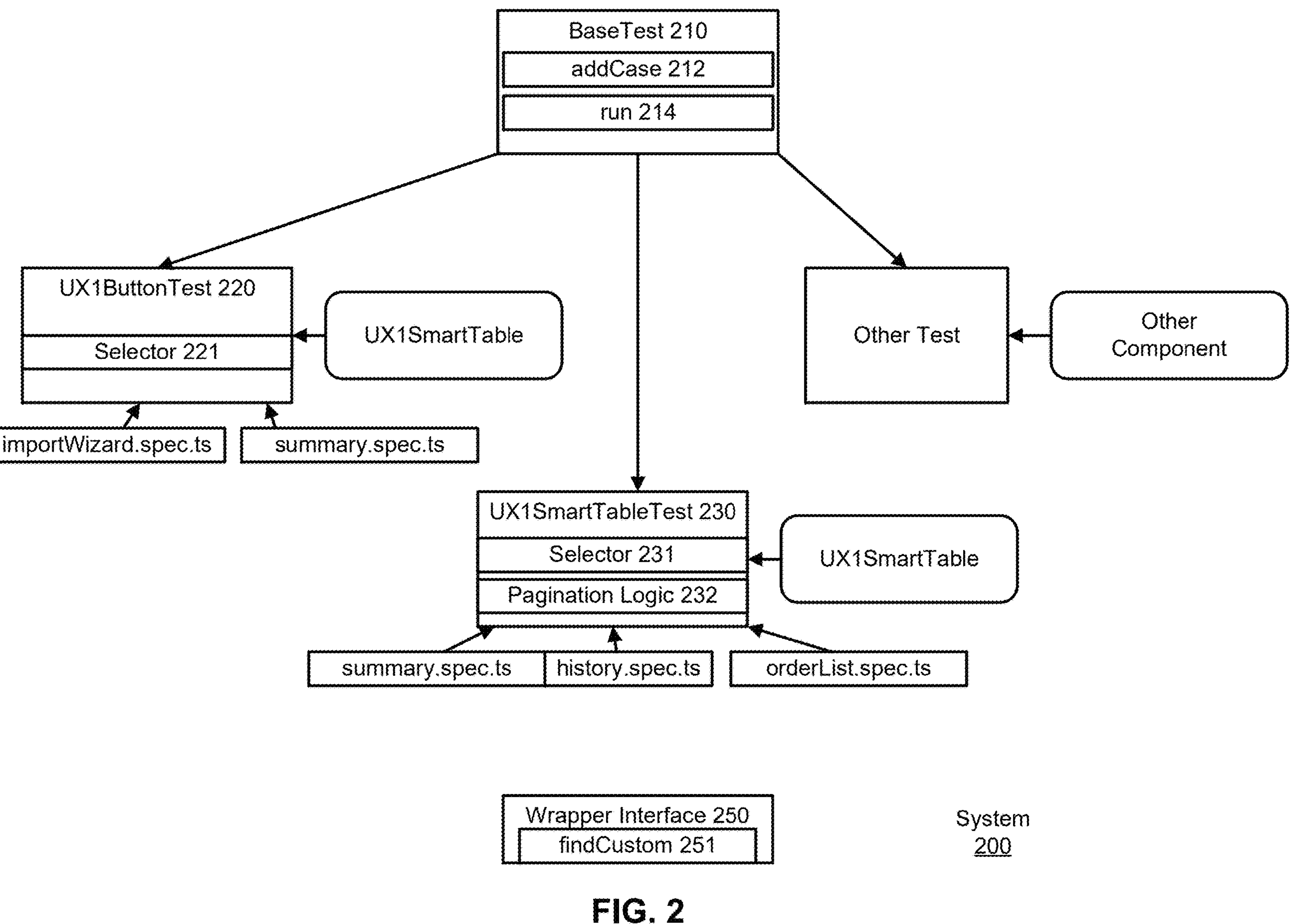
FIG. 2 is an illustration of a system for structured and reusable testing of UI components, according to some embodiments.

FIG. 2 illustrates system 200 for structured and reusable testing of UI components, utilizing a hierarchical facade-based architecture. System 200 is configured to provide modular, scalable, and dynamic testing by organizing tests into reusable base classes, component-specific subclasses, and wrapper interfaces while ensuring scalability, reusability, and test consistency across various applications.

System 200 includes BaseTest 210, which serves as the foundational class for all testing facades. BaseTest 210 provides core test infrastructure by enabling dynamic aggregation, storage, and execution of test cases. BaseTest 210 maintains a centralized test storage pool that collects and organizes test cases for execution. To achieve this, BaseTest 210 provides methods such as an addCase( ) method for dynamically adding individual test cases and a run( ) method that orchestrates test execution. By creating and managing wrappers for test components, BaseTest 210 enables that all test scenarios remain modular, readable, and maintainable. BaseTest 210 further enables inheritance, allowing subclasses to reuse its core testing functionality without duplicating logic.

In the next layer of the architecture, UX1ButtonTest 220 extends the functionality of BaseTest 210 by acting as a specialized facade for testing UX1Button components. UX1ButtonTest 220 inherits the core capabilities of BaseTest 210 and provides specific methods to validate component interactions, visibility states, and functional correctness. UX1ButtonTest 220 enables the creation of wrapper-based tests for UX1Button components, where selectors identify target components within the Document Object Model (DOM). Associated test cases, such as importWizard.spec.ts and summary.spec.ts, interact with UX1ButtonTest 220 to validate button behaviors. These test cases ensure that component-specific functionalities, including visual state verification and event triggering, operate as expected. UX1ButtonTest 220 simplifies testing workflows by centralizing common checks, such as visibility assertions, into reusable functions, making the tests easier to understand and maintain.

Similarly, UX1SmartTableTest 230 extends BaseTest 210 to serve as a facade for testing UX1SmartTable components. UX1SmartTableTest 230 enables structured validation of complex tables, including column definitions, row interactions, and pagination behavior. UX1SmartTableTest 230 incorporates selectors for identifying table components in the DOM, while also providing mechanisms for interacting with specific table states, such as validating row content, expanding rows, and verifying pagination functionality. Test cases, such as history.spec.ts and orderList.spec.ts, interact with UX1SmartTableTest 230 to validate smart table behaviors under different scenarios. By inheriting functionality from BaseTest 210, UX1SmartTableTest 230 enables the reuse of core testing infrastructure while providing specialized methods tailored for table components. The resulting structure enables that test cases remain modular and consistent across projects, minimizing duplication of code while improving test scalability.

System 200 further incorporates Wrapper Interface 250, which provides a standardized mechanism for interacting with DOM elements during test execution. Wrapper Interface 250 includes methods such as findCustom( ) which allows the dynamic instantiation of test components from their respective facade classes. By adding custom methods to the wrapper, Wrapper Interface 250 can integrate with Vue Test Utils and other testing libraries. During execution, Wrapper Interface 250 interacts with specific test components, such as UX1ButtonTest 220 or UX1SmartTableTest 230, to perform assertions and validations within the testing environment. This interface enables that all components are accessed and tested consistently across different scenarios, enabling efficient test orchestration.

The operation of system 200 begins with BaseTest 210, which serves as the root class for all testing scenarios. Subclasses such as UX1ButtonTest 220 and UX1SmartTableTest 230 inherit from BaseTest 210 and define specific validation methods tailored to individual components. Test cases for specific components are dynamically created using Wrapper Interface 250, which can interact with the DOM. Once instantiated, test cases are aggregated into the centralized storage pool maintained by BaseTest 210. The run( ) method orchestrates the execution of all registered test cases, ensuring that each test runs in isolation to prevent unintended side effects. After test execution, the wrapper is destroyed to maintain test isolation and ensure a clean testing environment.

System 200 provides several key advantages over conventional testing approaches. By centralizing test storage and reusing facade classes, system 200 reduces code duplication and simplifies test maintenance. The hierarchical architecture enables developers to create reusable test scenarios that can be applied across multiple projects with minimal modifications. The dynamic aggregation of test cases and use of standardized wrapper interfaces ensure that test execution remains consistent and scalable. Furthermore, system 200 enhances readability by abstracting implementation details within the facade classes, allowing developers to focus on test logic without managing low-level details. By supporting integration with frameworks such as Jest and Vue Test Utils, system 200 provides a robust and flexible solution for automating and scaling UI testing processes.

In a non-limiting example, the BaseTest class takes two arguments: a selector and a vueComponent. The selector is a Cascading Style Sheets (CSS) selector that is used to locate the target component within the Document Object Model (DOM) tree. The vueComponent is an instance of a Vue component, which is necessary for creating a wrapper during test execution and finding component stubs. BaseTest serves as the parent class for assembling and managing test scenarios, providing an API for dynamic test case registration and hierarchical test execution.

In some embodiments, UX1SmartTableTest 230 includes Selector 231, which enables identification of specific table elements in the DOM. Selector 231 provides a means for dynamically locating table components and verifying their properties during test execution. It ensures that targeted table components are correctly wrapped and available for further validation operations. In some embodiments, UX1SmartTableTest 230 further includes Pagination Logic 232, which provides a structured mechanism for verifying pagination behavior in smart tables. Pagination Logic 232 ensures that table navigation, page transitions, and content visibility conform to expected results across multiple test cases.

In some embodiments, Wrapper Interface 250 can include the findCustom 251 method, which allows dynamic instantiation and retrieval of test components. The findCustom 251 method provides enhanced flexibility by enabling direct access to specific test elements based on predefined criteria, improving test execution efficiency and modularity.

The BaseTest class implements core methods that allow test cases to be stored and executed dynamically. The addCase( ) method is provided to register test cases, while the saveTest( ) method enables that test cases are aggregated to the topmost instance of BaseTest. This architecture prevents individual tests from being stored at the instance level and enables centralized execution across complex testing chains.

```
export class BaseTest {
  protected selector: string=‘ ’;
  protected vueComponent: VueClass<Vue>|undefined;
  protected tests: TestCase[ ]=[ ];
  protected parent: BaseTest|null=null;
  constructor(selector: string, vueComponent?:
    VueClass<Vue>)
{
  this.selector=selector;
  this.vueComponent=vueComponent;
  expect(!! selector).toBeTruthy( );
  }
  . . .
}
```

The primary task of the base class is also to provide an API for assembling and storing tests before their execution.

```
public addCase(caseName: string, caseFunc: TestCaseFunction, searchCondition?: TestSearchCondition): this {
  this.saveTest(caseName, caseFunc, searchCondition,
    this);
  return this;
}
private saveTest(
  caseName: string,
  caseFunc: TestCaseFunction,
  searchCondition?: TestSearchCondition,
  testComponent?: BaseTest
): void {
  const componentName=this.constructor.name.replace
    (‘Test’, ‘ ’);
  const processCaseName=‘${componentName}:
    ${caseName}’;
  this.parent
    ? this.parent.saveTest(processCaseName, caseFunc,
      searchCondition, testComponent)
    : this.tests.push({caseFunc, searchCondition, component: testComponent, caseName: processCaseName});
  }
```

This algorithm is necessary to ensure that in the case of a chain of class calls for testing, all the required tests are not stored at the instance level but are passed to the topmost parent.

The TestComponent (which can be an embodiment of TestComponent 120) represents a subclass that inherits the basic functionality of BaseTest while allowing developers to define component-specific testing logic. Test components serve as a bridge between the generalized BaseTest infrastructure and the specific requirements of individual UI components. For example, when testing the UX1Table class, the TestComponent constructor accepts only a selector, such as .el-table, which locates the table element in the DOM. By leveraging BaseTest functionality, the TestComponent allows developers to perform operations such as column validation, row checks, and pagination testing with minimal redundancy.

The example implementation of TestComponent demonstrates how the inherited methods simplify the testing process for complex components, making the logic both modular and reusable.

```
describe('[Pagination] Price points IT', ( )=>{
  it('Pagination', async( )=>{
    const mockPaginationLoad=jest.fn( );
    mockPayload=(payload):
      Promise<IPlanResponse>=>{mockPaginationLoad
      (payload);
      return mockReturn(payload);
    };
    await new PricePointsComponentTest( )
      .findCustom(PricePointsComponentTest)
      .isVisible(true)
      // check cards
      .findCustom(CardListTest)
      .eachData(paginationCase.cards, 10)
      .isVisible(true)
      // click all cards for testing smart tables
      .addCase('click all cards', (wrapper)=>{wrapper.fin-
        dAll('.expand-card.header').wrappers.forEach
        ((el)=>el.trigger('click'));
      })
      .findCustom(UX1Table)
      .eachData(paginationCase.smartTables)
      //check opened cards
      .findCustom(ExpandCardTest)
      .expandCardCount(31)
      // last page, need click show more for remove button,
        response will be [ ]
      .findCustom(CardListTest)
      .isLastPage(true)
      .run( );
  });
});
```

The operation of the testing logic does not interfere with the underlying Jest framework or Vue Test Utils library, as the façade-based methods interact independently within the test class. Wrapper interfaces play a critical role in facilitating these interactions.

```
export const toUX1Wrapper=(wrapper: Wrapper<Vue>):
UX1Wrapper=>{
  addFindCustomMethod(wrapper);
  return wrapper as UX1Wrapper;
};
const addFindCustomMethod=(wrapper: Wrapper<Vue>):
void=>{
  (wrapper as UX1Wrapper).findCustom=<T extends
BaseTest>(type: {new( ): T}): T=>{
  return new type( );
  };
};
```

To execute the registered tests, BaseTest (which can be an embodiment of BaseTest 110, for example) implements a run( ) method that dynamically generates wrappers, executes the tests, and destroys the wrapper to ensure test isolation.

```
export class BaseTest {
  . . .
  public async run(options?: MountOptions<Vue>):
    Promise<void>{
    const wrapper=this.makeWrapper(options);
    await this.executeTests(wrapper, options?.stubs);
    wrapper.destroy( );
  }
  private async executeTests(wrapper: UX1Wrapper,
    stubs?: Stubs|false): Promise<void>{
    const tests=this.getAllTests( );
    for (const {caseName, caseFunc, component,
      searchCondition} of tests) {
      // eslint-disable-next-line no-console console.info
        (caseName);
      await wrapper.vm.$nextTick( );
      const stub=component?.vueComponent? wrapper-
        .findComponent(component.vueComponent):
        undefined;
      const vueComponent=searchCondition
        ? wrapper.findAll(searchCondition.bind(this)).at
          (0)
        : wrapper.find(component?.selector||this.selector);
      const componentWrapper=this.isStub(stub, stubs) ?
        stub: vueComponent;
      try {
        await caseFunc(wrapper, componentWrapper-
          ||vueComponent);
      } catch (e) {
        throw Error('${caseName}: \nReason:
          ${e}\nFunc: ${caseFunc}');
      }
    }
  }
}
```

System 200 in operation dynamically aggregates test cases through the addCase( ) and saveTest( ) methods, creates wrappers for the components under test, and executes the tests sequentially using the run( ) method. By destroying wrappers after execution, system 200 enables complete test isolation, preventing side effects across test scenarios. The centralized structure of the BaseTest class allows for modular test definitions, efficient test execution, and simplified maintenance of reusable test logic.

Thereby, system 200 improves the efficiency, maintainability, and scalability of test development workflows by introducing a hierarchical facade-based architecture. The use of BaseTest 210 as the root class, coupled with specialized facades such as UX1ButtonTest 220 and UX1SmartTableTest 230, enables that test logic remains reusable and modular. Wrapper Interface 250 further enhances flexibility by providing a standardized mechanism for interacting with test components. By simplifying the testing process and reducing redundancy, system 200 delivers significant improvements over prior testing approaches while enabling high-quality, scalable testing across frontend and backend components.

Figure 3:
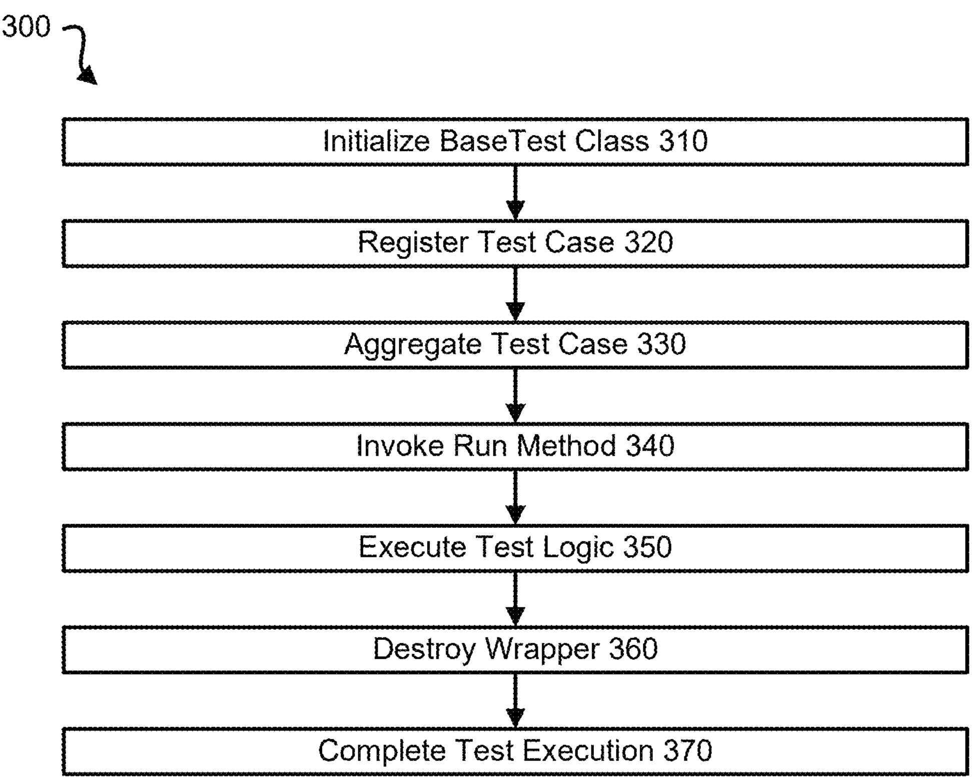
FIG. 3 is a flow diagram of a method for test case registration and execution, according to some embodiments.

FIG. 3 is a flowchart illustrating the process flow for dynamic test case registration and execution in system 200, according to some embodiments of the present disclosure. System 300 begins at operation 310, where the BaseTest class is initialized with a selector and an optional vueComponent. The selector is a Cascading Style Sheets (CSS) query that identifies the target component within the Document Object Model (DOM), while the vueComponent provides a reference to a Vue.js component for testing purposes. Initialization enables that the inputs are valid and establishes a base testing structure for subsequent operations.

At operation 320, individual test cases are dynamically registered using the addCase( ) method. The addCase( ) method takes three parameters: the test case name, a test function, and an optional search condition. Upon invocation, the addCase( ) method calls operation 330, which executes the saveTest( ) method to store the test case. In saveTest, the test case is stored at the topmost parent instance of the BaseTest class. This hierarchical storage enables that all test cases registered through chains of component-specific subclasses are aggregated at the highest level, enabling centralized execution.

Once test cases are registered, operation 340 begins the execution process. At this stage, the run( ) method of the BaseTest class is invoked. The run( ) method creates a test wrapper for the target component using the selector or vueComponent provided during initialization. The wrapper can integrate with a testing framework, such as Vue Test Utils, and dynamically locates the target component in the DOM tree or component hierarchy.

At operation 350, the system iterates through all registered test cases and executes each test function sequentially. During this operation, the test wrapper interacts with the component under test, applying the defined test logic such as visibility checks, state validation, or event triggers. The system also evaluates optional search conditions to ensure that specific elements or states are validated during test execution.

At operation 360, the system enables test isolation by destroying the test wrapper after all test cases have been executed. Wrapper destruction prevents unintended side effects between tests and enables a clean environment for subsequent test runs. Finally, at operation 370, the process completes with successful execution of all test cases, providing a report or log of test results for further analysis.

Method 300 provides dynamic and hierarchical test case registration, storage, and execution. By aggregating test cases at the parent level and using wrappers to interact with components, the system simplifies test management, enhances modularity, and enables isolation between tests.

Figure 4:
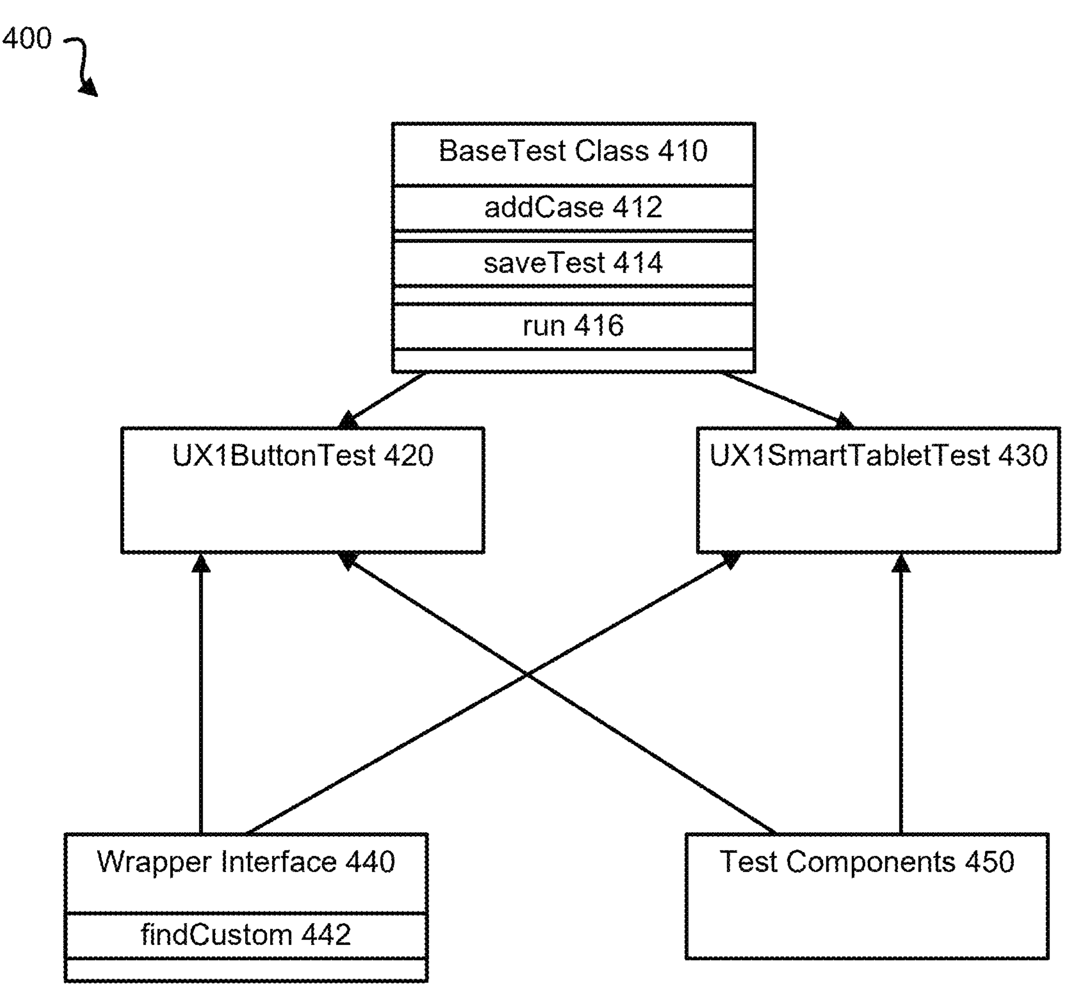
FIG. 4 is an illustration of embodiments of a class diagram of system components and inheritance, according to some embodiments.

FIG. 4 is a class diagram illustrating the hierarchical relationship between system components in system 400, according to some embodiments of the present disclosure. At the top of the hierarchy is the BaseTest class 410, which serves as the foundational class for all testing components. BaseTest 410 provides core functionalities required for managing, storing, and executing test cases. These functionalities include the addCase( ) method 412, which dynamically registers test cases, and the saveTest( ) method 414, which aggregates test cases at the topmost parent level in a hierarchical structure. BaseTest 410 further provides the run( ) method 416, which is responsible for executing the stored test cases using dynamically created wrappers.

Component-specific subclasses, including UX1ButtonTest 420 and UX1SmartTableTest 430, extend BaseTest 410. UX1ButtonTest 420 inherits the core functionality of Base Test 410 and provides specialized methods for testing button components. These methods allow developers to validate button visibility, state changes, and interactions, such as clicks or event triggers. Similarly, UX1SmartTableTest 430 extends BaseTest 410 to facilitate the testing of complex table components. UX1SmartTableTest 430 includes methods for verifying table rows, validating column definitions, and testing pagination behavior. Both subclasses utilize the reusable functionality provided by BaseTest 410, ensuring consistency across test cases while reducing redundant logic.

The class diagram also includes a Wrapper Interface 440, which can integrate with both BaseTest 410 and its subclasses. Wrapper Interface 440 introduces a method, such as findCustom( ) (which can be included in an embodiment of Wrapper Interface 140 or 250, for example), that dynamically locates components in the DOM or component tree. This interface can facilitate interaction between the test classes and the underlying testing framework, such as Vue Test Utils, and enables developers to create test wrappers for specific components. The Wrapper Interface 440 provides a consistent and extensible mechanism for interacting with components under test, regardless of their structure or complexity.

At the bottom of the hierarchy, individual Test Components 450 are shown, which interact with component-specific subclasses to validate specific behaviors or states. For example, a Test Component 450 associated with UX1SmartTableTest 430 may include test scenarios for validating column data, expanding rows, or checking pagination behavior. These test components rely on the functionality provided by their respective facade classes and interact with the Wrapper Interface 440 for test execution.

Thus, BaseTest class 410 serves as the root for all test logic while component-specific subclasses, such as UX1ButtonTest 420 and UX1SmartTableTest 430, extend this functionality to provide adapted methods for testing individual components. By integrating with the Wrapper Interface 440, the system enables modularity, reusability, and consistency across all test cases. This structure simplifies test maintenance, reduces redundancy, and enhances scalability, making it suitable for modern software testing frameworks.

Figure 5:
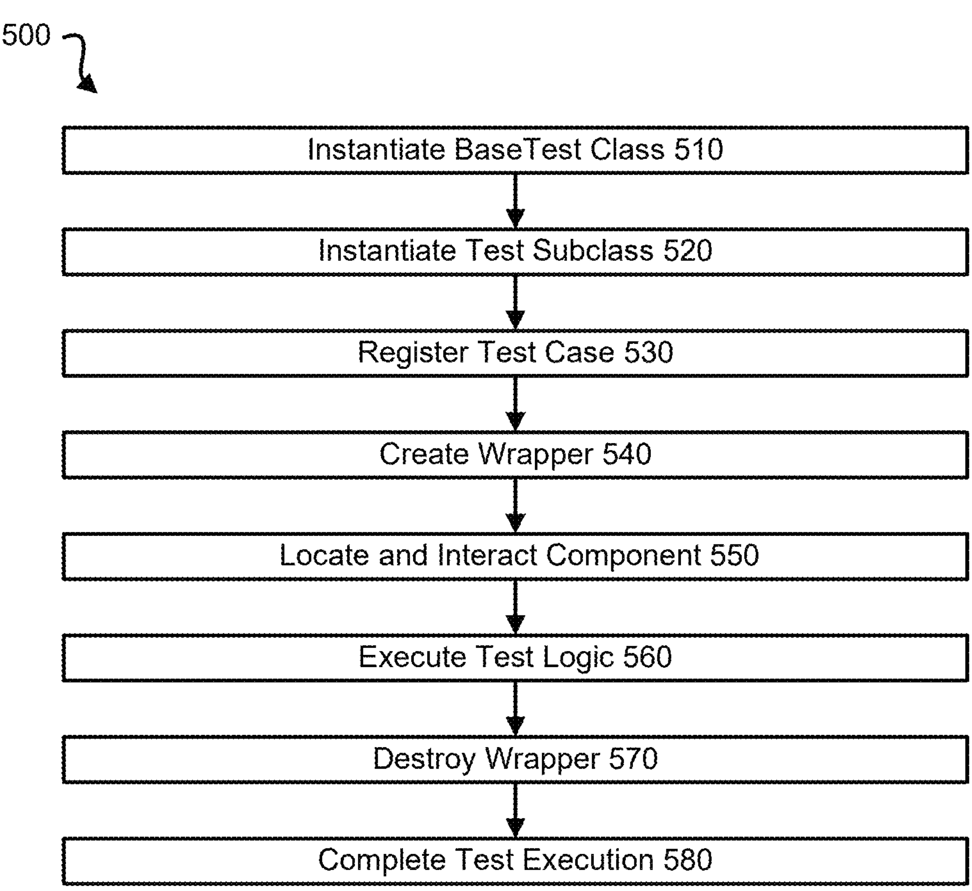
FIG. 5 is a flow diagram of a method for dynamic test execution, according to some embodiments.

FIG. 5 is a sequence diagram illustrating the dynamic test execution process in system 500, according to some embodiments of the present disclosure. The sequence begins at operation 510, where the BaseTest class is instantiated with a selector and, optionally, a vueComponent. The selector is a CSS query that identifies the target component within the DOM, while the vueComponent provides an instance of a Vue.js component for wrapper creation.

At operation 520, a subclass of BaseTest, such as UX1ButtonTest or UX1SmartTableTest, is instantiated. These subclasses inherit the core functionality of BaseTest and include additional component-specific logic for validating behavior or interactions. The subclass calls the addCase( ) method provided by BaseTest to register individual test cases dynamically. This triggers operation 530, where the saveTest( ) method aggregates the test case. If the test component is part of a hierarchical chain, the save Test( ) method can cause the test case to be stored at the topmost parent level of the BaseTest instance.

Following test case registration, at operation 540, the run( ) method is invoked to execute the tests. The run( ) method creates a wrapper for the component under test by leveraging the selector or vueComponent passed during initialization. At operation 550, the wrapper interacts with the target component through the Wrapper Interface and the Vue Test Utils library. The findCustom( ) method is used to locate the specific test components dynamically, enabling the execution of the test logic defined in each registered test case. At operation 560, the system iterates through all test cases stored in the test pool [0066] and executes each test function sequentially. The wrapper triggers actions, such as visibility checks, event simulations, or data validation, depending on the logic defined in each test case. At operation 570, once all test cases have been executed, the wrapper is destroyed to ensure test isolation and prevent unintended side effects. The process concludes at operation 580, where test results are reported or logged for further analysis.

Thereby, the sequence of interactions between the BaseTest class, its subclasses, the Wrapper Interface, and the underlying testing framework can centralize test logic and dynamically locate components. The system enables consistent and modular test execution while maintaining test isolation.

Figure 6:
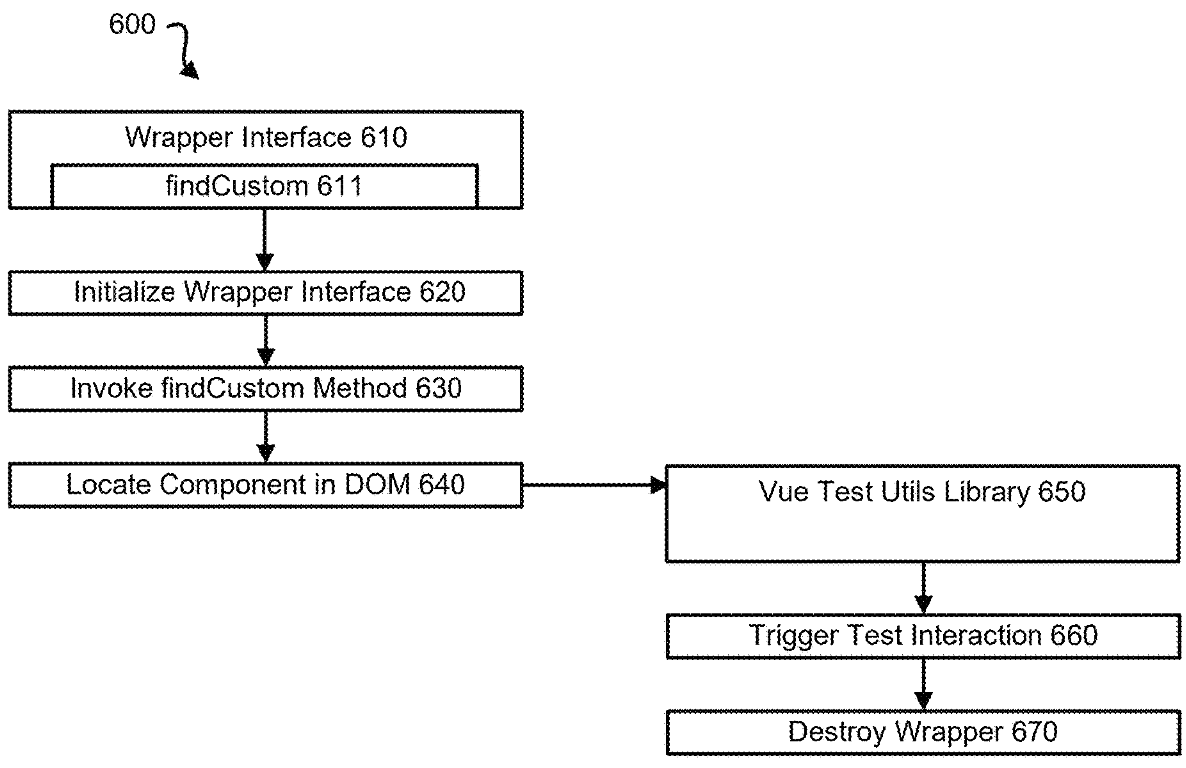
FIG. 6 is a flow diagram of a method for wrapper interface and vue test utils interaction, according to some embodiments.

FIG. 6 is a diagram illustrating the interaction between the Wrapper Interface and the Vue Test Utils library during component search and testing in system 600, according to some embodiments of the present disclosure. The Wrapper Interface 610 serves as a bridge between the BaseTest class and the underlying testing framework, providing a standardized mechanism for locating and interacting with components in the DOM.

At operation 620, the system initializes the Wrapper Interface by creating a test wrapper for the target component using the selector or vueComponent provided during BaseTest initialization. The Wrapper Interface includes a findCustom( ) method, which is invoked at operation 630 to locate a specific test component dynamically. The findCustom( ) method accepts a class inherited from BaseTest, such as UX1ButtonTest or UX1SmartTableTest, and instantiates it as a test component. This enables developers to define and reuse component-specific test logic without duplicating code.

At operation 640, the Wrapper Interface interacts with the Vue Test Utils library 650 to locate the target component within the DOM. The Vue Test Utils library provides methods, such as find( ) and findComponent( ) which allow the wrapper to query for components based on selectors or Vue.js stubs. The Wrapper Interface calls these methods to retrieve references to the target component, enabling the execution of test logic such as visibility checks, state validation, or event simulations.

At operation 660, the Wrapper Interface facilitates interaction with the located component. For example, the wrapper may trigger an event, such as a click, validate a component state, or check for the presence of specific attributes. These operations are abstracted within the facade classes inherited from BaseTest, ensuring that the testing logic remains consistent and reusable across projects.

At operation 670, once the test logic has been executed, the wrapper is destroyed to prevent side effects and maintain test isolation. The interaction between the Wrapper Interface and Vue Test Utils enables that components are dynamically located and tested while remaining compatible with existing testing frameworks.

Thereby, the Wrapper Interface 610 standardizes the process of locating and interacting with components during testing. By integrating with the Vue Test Utils library 650, the Wrapper Interface 610 enables interaction with the DOM and provides a consistent mechanism for executing test logic across different components. This methodology simplifies test development, improves modularity, and enables compatibility with modern testing frameworks.

Figure 7:
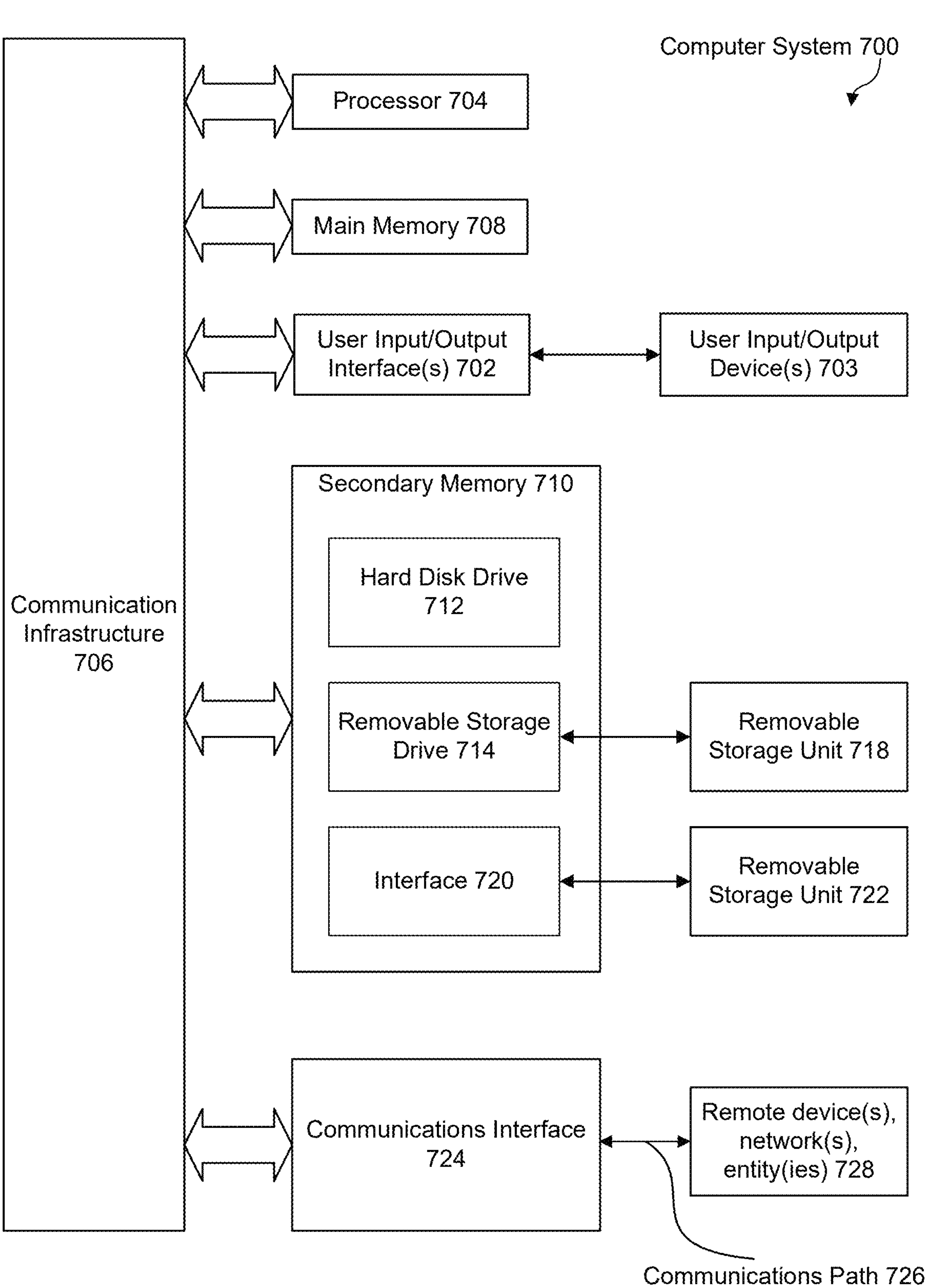
FIG. 7 illustrates an example computing device, according to some embodiments.

FIG. 7 is a block diagram of example components of device 700. One or more computer systems 700 may be used, for example, to implement any of the embodiments discussed herein, as well as combinations and sub-combinations thereof. Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more processors 704 may be a graphics processing unit (GPU). In an embodiment, a GPU may be a processor that can be a specialized electronic circuit configured to process mathematically intensive applications. The GPU may have a parallel structure that can be efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714.

Removable storage drive 714 may interact with a removable storage unit 718. Removable storage unit 718 may include a computer-usable or readable storage device having stored thereon computer software (control logic) and/or data. Removable storage unit 718 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This can include, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for reusable testing of user interface (UI) components, the system comprising: a memory storing instructions; and a processor coupled to the memory, wherein execution of the instructions causes the processor to:

initialize a base test class with a selector for identifying a target component in a Document Object Model (DOM);

register a test case dynamically using an addCase method, the test case comprising a test function and an optional search condition;

aggregate the registered test case to a topmost parent instance of the base test class;

execute the test case by creating a wrapper for the target component;

perform test logic on the wrapper using the registered test function, wherein the base test class is further configured to propagate the test cases to a topmost parent instance for centralized execution.

2. The system of claim 1, wherein the addCase method is configured to register a test case with a test name, a test function, and an optional search condition.

3. The system of claim 1, further comprising a wrapper interface coupled to the base test class, the wrapper interface configured to dynamically instantiate test components and interact with the DOM through a findCustom method.

4. The system of claim 1, further comprising a facade library configured to store reusable facade classes, the reusable facade classes wrapping core test logic into reusable functions for testing UI components.

5. The system of claim 1, wherein the base test class includes an execution method to enable test isolation by destroying the wrapper after test execution.

6. The system of claim 1, further comprising a component-specific test subclass inherited from the base test class, wherein the component-specific test subclass is configured to implement testing logic for a UI component.

7. The system of claim 6, wherein the component-specific subclass is configured to validate parameters of a UI component, including at least one of visibility, event interactions, column data, row states, or pagination functionality.

8. A computer-implemented method for centralized and hierarchical testing of user interface (UI) components, the method comprising:

initializing a base test class with a selector for identifying a target component in a Document Object Model (DOM);

registering a test case dynamically using an addCase method, the test case comprising a test function and an optional search condition;

aggregating the registered test case to a topmost parent instance of the base test class;

executing the test case by creating a wrapper for the target component;

performing test logic on the wrapper using the registered test function.

9. The method of claim 8, further comprising propagating registered test cases through a saveTest method that centralizes test storage at the topmost parent instance.

10. The method of claim 8, further comprising dynamically locating and wrapping a specific test component using a findCustom method integrated with a wrapper interface.

11. The method of claim 8, further comprising executing multiple test cases sequentially by iterating through a centralized test pool stored in the base test class.

12. The method of claim 8, further comprising defining a component-specific test subclass inherited from the base test class, wherein the subclass implements methods for validating component-specific behavior.

13. The method of claim 12, wherein the component-specific test subclass is configured to perform at least one of: checking component visibility, triggering events, validating column or row data, or verifying pagination states.

14. The method of claim 8, further comprising dynamically generating a wrapper using a selector and executing test functions through the wrapper integrated with a testing framework.

15. The method of claim 8, further comprising centralizing reusable test logic into a facade library, the facade library configured to wrap testing operations into reusable methods.

16. A non-transitory tangible computer-readable device having instructions stored thereon that, when executed by a computing device, cause the computing device to perform operations comprising:

initializing a base test class with a selector for identifying a target component in a Document Object Model (DOM);

dynamically registering a test case using an addCase method, the test case comprising a test name, a test function, and an optional search condition;

aggregating registered test cases to a centralized test pool at a topmost parent instance of the base test class;

executing the registered test cases by creating a wrapper for the target component using the selector;

performing a test function dynamically on the wrapper.

17. The non-transitory computer-readable device of claim 16, wherein the instructions further cause the computing device to dynamically locate and instantiate a specific test component using a findCustom method integrated with a wrapper interface.

18. The non-transitory computer-readable device of claim 16, wherein the instructions further cause the computing device to execute test cases sequentially by iterating through the aggregated test pool stored in the base test class.

19. The non-transitory computer-readable device of claim 16, wherein the instructions further cause the computing device to implement a component-specific test subclass inherited from the base test class, the subclass configured to validate component-specific parameters including visibility, event triggers, or table row states.

20. The non-transitory computer-readable device of claim 16, wherein the instructions further cause the computing device to propagate registered test cases to the topmost parent instance using a saveTest method for centralized execution.

* * * * *